Patented Sept. 6, 1932

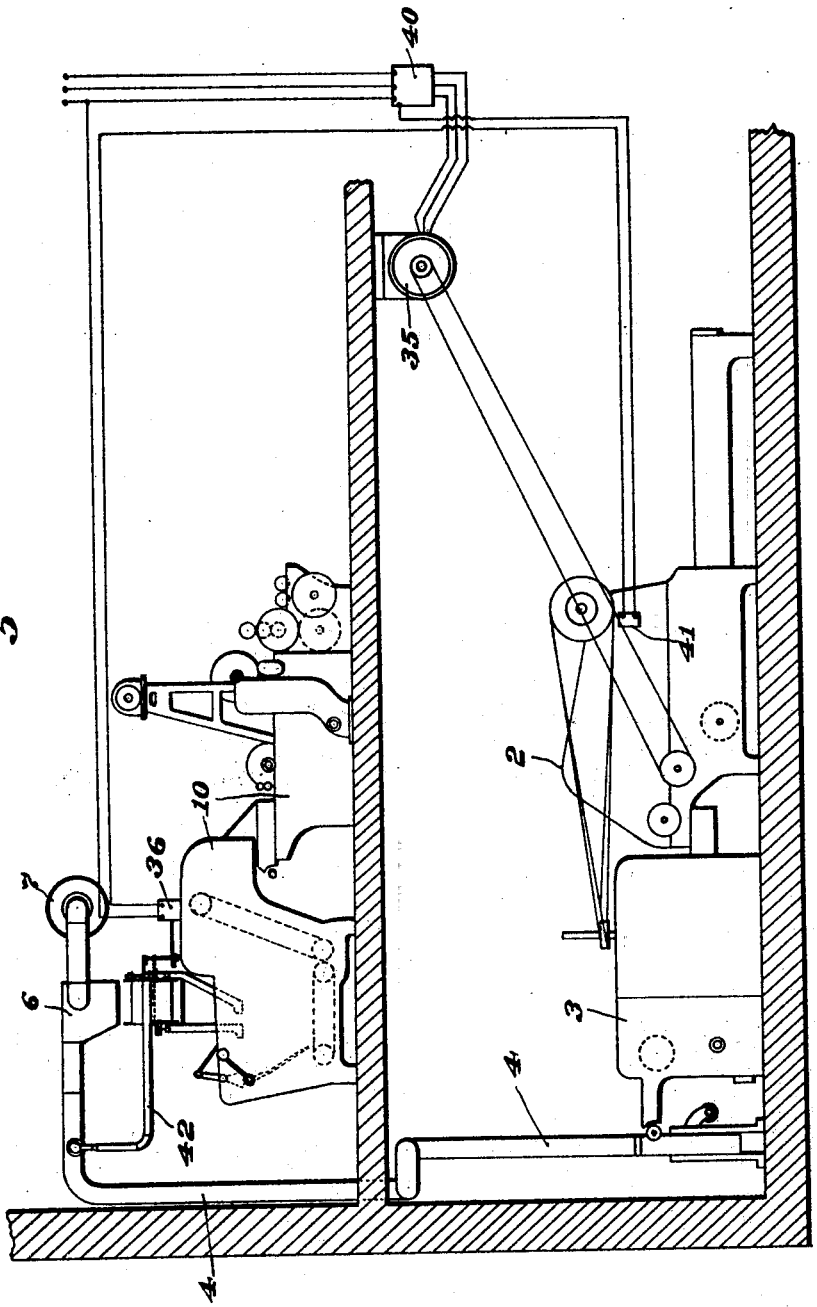

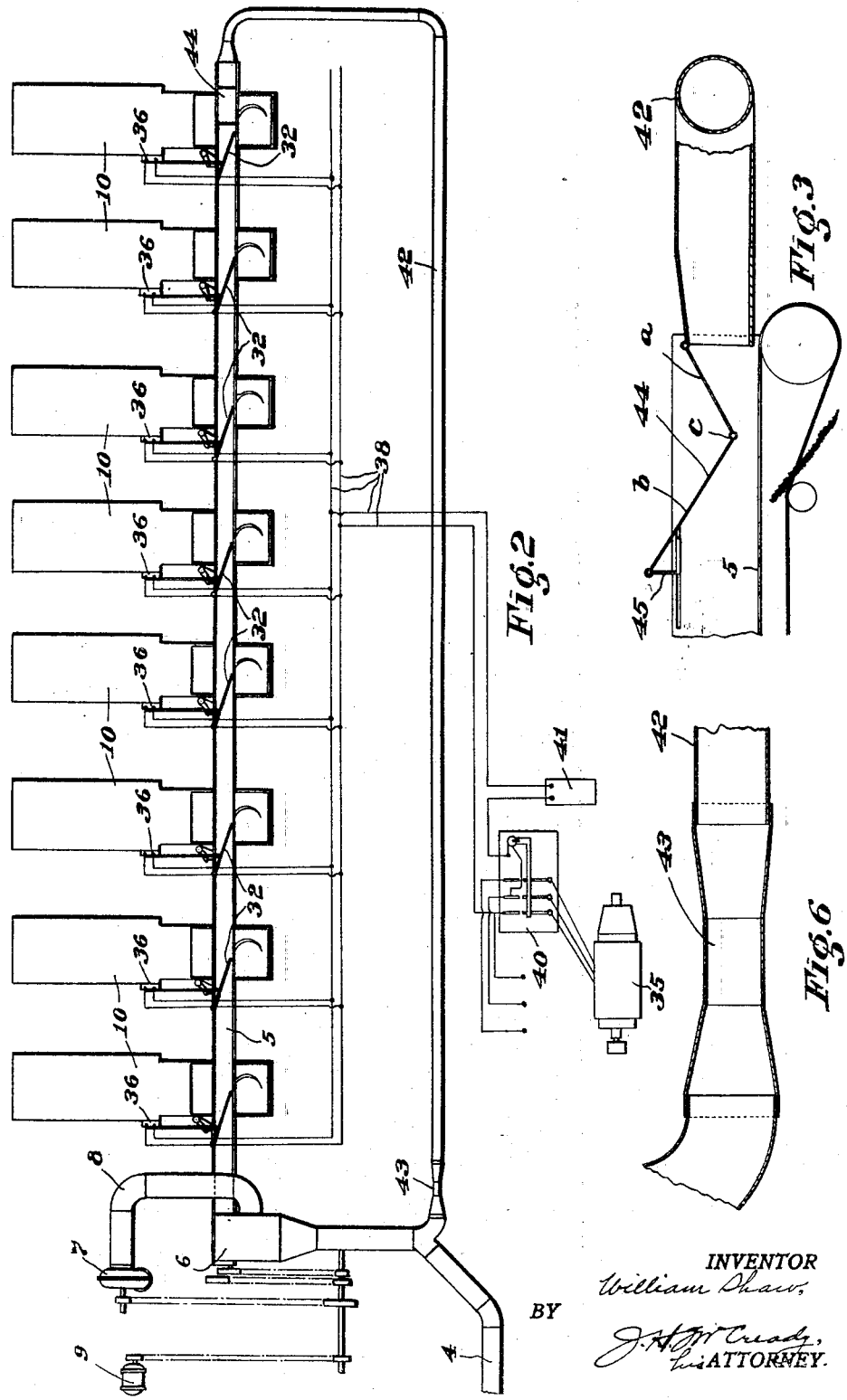

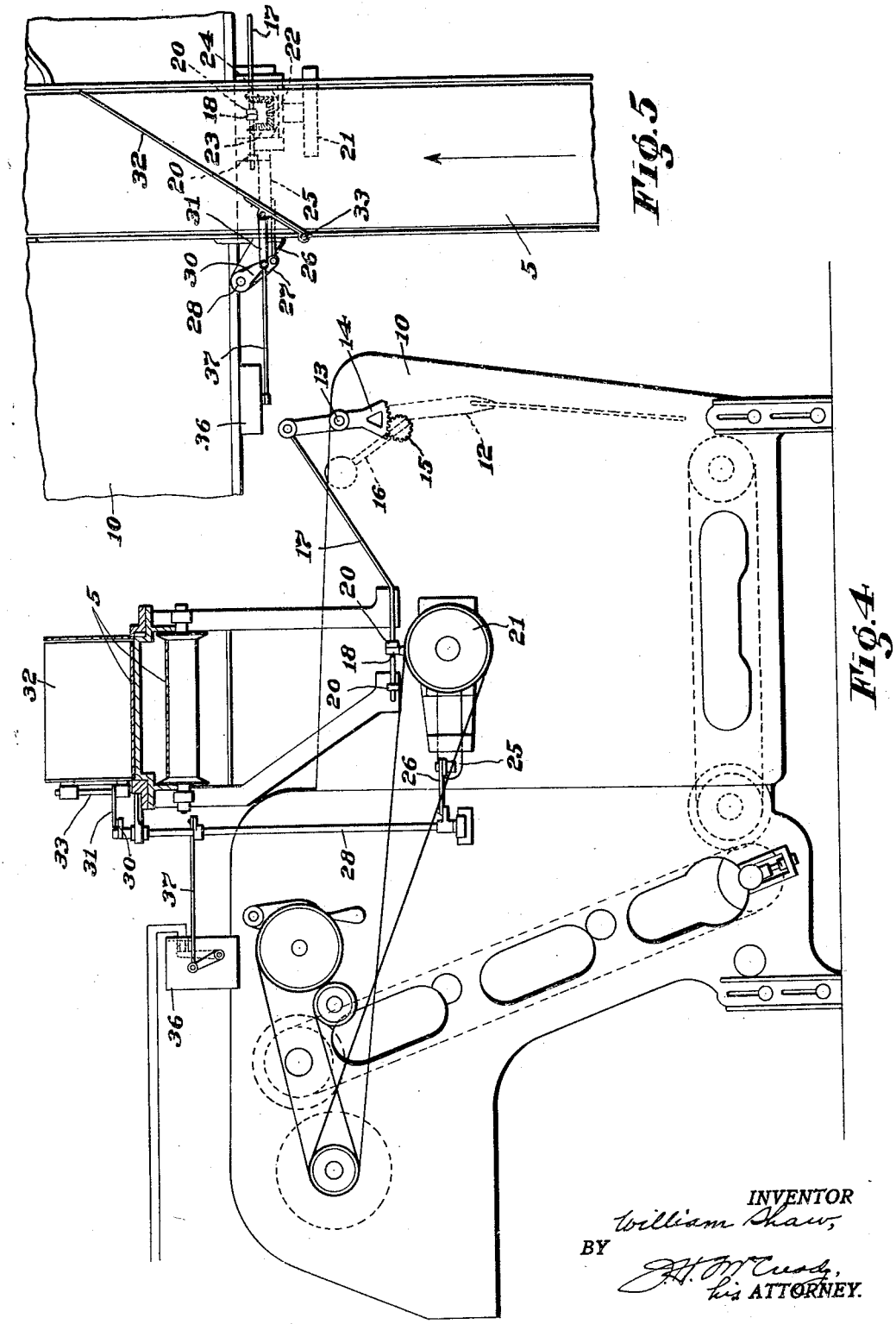

1,875,356

UNITED STATES PATENT OFFICE

WILLIAM SHAW, OF LOWELL, MASSACHUSETTS, ASSIGNOR TO SACO-LOWELL SHOPS, OF NEWTON, MASSACHUSETTS, A CORPORATION OF MASSACHUSETTS

COTTON DISTRIBUTING SYSTEM

Application filed February 28, 1929. Serial No. 343,493.

This invention relates to systems for delivering cotton automatically to a series of machines and controlling the discharge of cotton to the individual machines in accordance with their respective requirements. A well known type of apparatus of this character is known commercially as the Morton distributor, and an improved system is shown and described in the Curley Patent No. 1,630,375, granted May 31, 1927, and assigned to the assignee of the present invention.

A typical distributing system organized in accordance with said patent includes a Morton distributor for supplying cotton to a series of pickers, a bale breaker, usually located at some distance from the picking room and serving to prepare the cotton for delivery to the pickers, and conveying apparatus for carrying the cotton from the bale breaker or other preparing machinery to the distributor. This distributor includes a belt running past and above the entire series of feed hoppers of the picking machines, and a series of gates, one for each machine, mounted to be swung across the belt and serving when so positioned to divert cotton from the belt into the feed hoppers of their respective machines. Each gate is under the control of a feeler located in the feed hopper, and the arrangement is such that when any picker requires cotton the gate for that particular machine will be swung into its open position, diagonally across the belt, and it will remain in this position until the feeler in the hopper causes the closing of the gate after the supply of cotton in the hopper has been replenished. The bale breaker is driven by an electric motor and the control circuit for this motor includes a series of switches connected in parallel and arranged to be operated by the respective gates on the feed hoppers, the arrangement being such that so long as any picker is calling for cotton the bale breaker will be kept in operation, but when the demands of all of the pickers have been satisfied and the gates consequently are all closed, the switches then will all be opened and the motor driving the bale breaker will be stopped. This interrupts the delivery of cotton from the bale breaker to the conveyor. While various other organizations can be made within the scope of the patent above designated, that just described is typical.

Due to the fact that the bale breaker usually is located at a considerable distance away from the picker room, a very substantial quantity of cotton will be in transit between the bale breaker and the Morton distributor when the bale breaker is shut down. In order to take care of this cotton it has been customary to lock the gate of the feed hopper of the last picker in the series in its open position, and the cotton in transit thus is discharged into this last feed hopper. In many systems the quantity of cotton in transit is so great that it cannot be accommodated in a single feed hopper and consequently it overflows on the floor of the picker room. Furthermore, in this arrangement the gate of the last feed hopper is not automatically controlled, as are the gates for the other feeders, and the last machine in the series, therefore, receives cotton only when no other machine is calling for it. Consequently, this last picker usually is in a condition of being either starved or overfed, and it therefore makes a lap which varies excessively in thickness. While, therefore, the system above described represents a very substantial advance over those formerly used, and has advantages well recognized in the trade and which have resulted in its rapid adoption, it does, nevertheless, have the two objectionable features just described.

The present invention deals particularly with these difficulties and it aims to improve systems of this type with a view to eliminating these objectionable features. While the invention is especially concerned with systems of the general type disclosed in the patent above designated, some of the features of the invention are also useful in other distributing systems which are not as completely automatic.

The nature of the invention will be readily understood from the following description when read in connection with the accompanying drawings, and the novel features will be particularly pointed out in the appended claims.

In the drawings,

Figure 1 is a diagrammatic view illustrating certain features of a system embodying this invention;

Fig. 2 is a diagrammatic plan view showing additional features of the system shown in Fig. 1;

Fig. 3 is a side view of parts at the discharge end of the conveyor belt, certain of the parts being shown in section;

Fig. 4 is a side view of the feed hopper showing the conveying belt and parts associated therewith in section;

Fig. 5 is a plan view of parts of the machine shown in Fig. 4; and

Fig. 6 is a sectional view through a portion of one of the pneumatic conveyors illustrated in Fig. 2.

Referring first to Figs. 1 and 2, the system there shown includes a bale breaker 2 of a common type arranged to discharge the cotton fed through it into a vertical opener 3. These machines prepare the cotton for delivery to the pickers. The opener discharges its cotton into the intake end of a wind trunk or pneumatic conveying apparatus 4 which delivers the cotton to the distributor belt 5 in the picker room. A condenser 6 is located at the discharge end of the conveyor 4 and serves to take the cotton out of the current of air travelling through the wind trunk and deposit it on the belt 5. In the particular arrangement shown the suction for conveying the cotton is provided by a suction blower 7 which is connected with the condenser through a pipe 8, the blower being driven from an electric motor 9. This motor may also supply the power for driving the belt 5.

The distributor belt 5 supplies cotton to the feed hoppers of a series of cotton working machines indicated at 10, and these machines may be of any one of a variety of types, the particular machines shown being picker lappers.

As above stated, the discharge of cotton from the belt to the respective cotton working machines is controlled automatically in accordance with the requirements of the individual machines. This controlling mechanism may be arranged substantially as shown and described in the Curley patent above designated. The construction shown, however, is somewhat different. Referring to Figs. 4 and 5, which illustrate a typical feed hopper and associated mechanism, it will be seen that the hopper is equipped with a feeler fork or rake 12 which is mounted on a horizontal rock shaft 13. A gear sector 14 also is secured on this rock shaft and meshes with a pinion 15, to which a weighted arm 16 is secured. The weight tends to swing the fork 12 forward toward the central part of the hopper. A rod 17 connects the upper end of the feeler fork lever with the control arm 18 of a positive operating unit of the character shown in my pending application Serial No. 192,910, collars 20—20 being secured adjustably on the rod at opposite sides of the arm 18. This control mechanism includes a continuously driven pulley 21 driving a bevel gear 22 which meshes with two additional bevel gears 23 and 24, Fig. 5. The control arm 18 operates clutches which render either one of the bevel gears 23 or 24, as desired, operative to revolve a worm which drives a slide 25 forward or backward, depending upon the direction of rotation of the worm. For a more complete description of the construction and operation of this mechanism, reference should be made to my application above identified. A link 26 connects the slide 25 with an arm 27 secured on the lower end of an upright rock shaft 28, and another arm 30 at the upper end of this rock shaft is connected by a link 31 to a gate 32 which is mounted on an upright pivot 33 located at one side of the distributor belt 5.

So long as an ample supply of cotton remains in the hopper the feeler fork or rake 12 will occupy substantially the position in which it appears in Fig. 4; but when the supply of cotton becomes depleted the feeler fork will be swung forward or toward the left Fig. 4, by the weighted arm 16 and its connections with the fork. This will cause the left-hand collar 20 to engage the control arm 18 and move it toward the right, Fig. 4, thus operating through the positive control mechanism to move the slide 25 toward the right, and hence to swing the gate 32 into the so-called "open" position in which it appears in Figs. 4 and 5. In this position it diverts cotton from the belt 5 into the feed hopper.

As soon as the supply of cotton in the hopper has been replenished, the weight of the cotton pushes the feeler fork backwardly into its original position, as shown in Fig. 4, thus causing a reversal of the movement of the slide 25, whereupon the gate 32 is swung into its closed position where it lies beside and parallel to the belt 5. Figs. 4 and 5 show the parts in substantially the positions they occupy when the gate closing movement is about to be started.

Each of the pickers or cotton working machines 10 shown in Fig. 2, including the last machine in the series, is equipped with an automatic gate operating mechanism like that shown in Figs. 4 and 5. The system illustrated also includes an automatic control mechanism for the bale breaker or other preparing machinery which is organized substantially in accordance with the disclosure made in the Curley patent. This mechanism serves to interrupt automatically the delivery of cotton to the distributor when the demands of all of the cotton working machines have been satisfied, and to start such delivery again when any machine in the series requires more cotton. For this purpose the bale breaker is driven by an electric motor 35, Figs. 1 and 2, and the cotton opener is driven by belt connections with the bale breaker. Preferably the blower 7 for the pneumatic conveyor is operated continuously, but it is evident that if the feed lattice of the bale breaker is stopped, the delivery of cotton to the pneumatic conveyor will be stopped, and consequently, the supply of cotton to the cotton working machines 10 will be interrupted.

Referring again to Figs. 4 and 5 it will be seen that each feed hopper is equipped with an electric switch 36 and that the movable element of this switch is connected by a link 37 with an arm secured to the rock shaft 28 which operates the gate 32. The arrangement is such that when the rock shaft is moved to open the gate 32 the switch 36 will be closed and when the gate is closed again the switch will be opened. All of these switches are connected in parallel in a control circuit 38, Fig. 2, which runs to a main or master switch 40 for controlling the motor 35 of the bale breaker. This switch is of the electro-magnetic type and includes a spring for opening it and an electric magnet for closing it when the circuit through the magnetic coil is closed, this coil being included in the control circuit 38. Consequently, so long as any one of the cotton working machines is calling for cotton and its switch 36 therefore remains closed, the control circuit will be closed, the switch 40 will remain closed and the bale breaker motor 35 will be kept running. As soon, however, as the demands of all of the machines have been supplied and all of the hopper switches 36 consequently are opened, the control circuit then will be opened, the switch 40 will open automatically, and the motor 35 consequently will stop, thus interrupting the delivery of cotton to the pneumatic conveyor 4. A manually controlled starting and stopping switch 41 may be connected with the switch 40 to operate the latter independently of the hopper switches.

In order to take care of the cotton which is in transit between the bale breaker and the discharge end of the conveyor belt when such an interruption occurs, a supplemental or emergency conveyor 42 is arranged to receive cotton carried past all the machines by the belt 5 and to return this cotton to the conveyor 4 at a point in advance of the condenser 6. This conveyor 42 is of the pneumatic type and it cooperates with the belt 5 and a small part of the conveying apparatus 4 to form a loop in which the cotton is kept in motion so long as it is not needed, but which operates to deliver the cotton to the cotton working machines as soon as any one of them requires such delivery. So long as no machine calls for cotton the cotton simply circulates through the loop. This supplemental or emergency conveyor is in operation continuously when the system is operating so that it receives cotton whenever there is surplus and returns this cotton immediately thereafter and substantially as fast as it is received to the main conveyor 4.

It will be observed that the suction required to carry cotton through the emergency conveyor 42 is derived from the suction blower 7, and in order to prevent the emergency conveyor from robbing the main conveyor of air, the former is made of considerably smaller dimensions than the latter. Also, the conveyor 42 is connected with the wind trunk 4 through a reduced portion or neck 43 which is made of such a size as to produce the desired distribution of air between the two conveyors while still leaving the main part of the emergency or supplemental conveyor sufficiently large to avoid any substantial danger of its becoming plugged with cotton.

In an apparatus of this character there is some tendency for the cotton to plug the intake end of the emergency conveyor, and I have therefore arranged an adjustable gate or damper device 44, best shown in Fig. 3, immediately in front of the intake end of the conveyor and over the discharge end of the belt 5. This device comprises two plates $a$ and $b$ pivoted together, the former being pivoted on the intake end of the conveyor 42, and the latter on a slide 45 which is adjustable in one wall of the guideway through which the conveyor belt 5 travels. By adjusting the slide 45 backward or forward the middle point $c$ of this damper device can be raised or lowered and its distance properly spaced from the belt 5. These plates extend substantially across the space between the upright side pieces of the guideway and, consequently, this damper device forms a restricted throat over the belt and immediately in front of the intake end of the conveyor which serves to increase the air velocity at this point and prevent cotton from plugging the intake end of the conveyor.

It will now be clear that the invention effectually overcomes the two objections that have been found to prior distributing systems of the character above described. In other words, it provides a system in which the last cotton working machine in the series has the same automatic control of the delivery of cotton thereto as do the others. It also provides means for receiving the cotton in transit whenever the cotton working machinery is shut down, and delivering this cotton again to the conveyor which carries it to the distributing belt so that the cotton not needed by the machines is kept in motion and ready for delivery to any machine as soon as it calls for cotton. This, in turn, results in reducing the variations in level of the cotton in the feed hoppers and therefore tends to reduce variations in the laps produced by the different machines.

While I have herein shown and described a preferred embodiment of my invention, it will be understood that the invention may be embodied in other forms without departing from the spirit or scope thereof. The material handled by the system has been particularly referred to as cotton since this is the material most commonly handled by distributing systems of this type, but it is obvious that the system can be used to handle fibres of a different nature, and the term "cotton", therefore, is intended to include other fibres which can be handled in the system shown.

Having thus described my invention, what I desire to claim as new is:

1. In a cotton distributing system, the combination of a series of cotton working machines, machinery for preparing the cotton for delivery to said cotton working machines, conveying apparatus for carrying the cotton from said preparing machinery to said cotton working machines and including a belt for conveying the cotton past the entire series of the latter machines, devices for automatically controlling the delivery of cotton by said belt to the different cotton working machines in accordance with their individual requirements, and an additional suction conveyor operative continuously to receive any cotton discharged at the delivery end of said belt and to carry the cotton so discharged back to said conveying apparatus and deliver it thereto at a point in advance of the cotton working machines.

2. In a cotton distributing system, the combination of a series of cotton working machines, machinery for preparing the cotton for delivery to said cotton working machines, a belt for conveying cotton past the entire series of said machines, devices for automatically controlling the delivery of cotton by said belt to the different cotton working machines in accordance with their individual requirements, a main pneumatic conveying apparatus for carrying the cotton from said preparing machinery to said belt, means for automatically stopping the delivery of cotton from said preparing machinery to said pneumatic conveying apparatus when the demands of said cotton working machines have been satisfied and for automatically starting such delivery again when any machine in said series requires cotton, and a supplemental pneumatic conveyor operative continuously to receive cotton from the discharge end of said belt and to return it automatically to a point where it will again be delivered to the receiving end of said belt.

3. In a cotton distributing system, the combination of a series of cotton working machines, machinery for preparing the cotton for delivery to said cotton working machines, a belt for conveying cotton past the entire series of said machines, devices for automatically controlling the delivery of cotton by said belt to the different cotton working machines in accordance with their individual requirements, a main pneumatic conveying apparatus for carrying the cotton from said preparing machinery to said belt, means for automatically stopping the delivery of cotton from said preparing machinery to said pneumatic conveying apparatus when the demands of said cotton working machines have been satisfied and for automatically starting such delivery again when any machine in said series requires cotton, and supplemental pneumatic conveyor operative continuously to receive cotton carried past said machines by said belt and to return it again automatically to said main pneumatic conveying apparatus in position to be delivered by said apparatus to the belt.

4. In a cotton distributing system, the combination of a series of cottonworking machines, a belt for conveying cotton past the entire series of said machines, devices for automatically controlling the delivery of cotton by said belt to the different machines in accordance with their individual requirements, a main pneumatic conveyor for delivering cotton to said belt, a condenser at the discharge end of said pneumatic conveyor, and an emergency pneumatic conveyor for continuously carrying cotton from the discharge end of said belt to a point in said main conveyor in advance of said condenser, said emergency conveyor including a restricted portion located between its intake and delivery ends.

5. In a cotton distributing system, the combination of a series of cotton working machines, a belt for conveying cotton past the entire series of said machines, devices for automatically controlling the delivery of cotton by said belt to the different machines in accordance with their individual requirements, a main pneumatic conveyor for delivering cotton to said belt, a condenser at the discharge end of said pneumatic conveyor, an emergency pneumatic conveyor for carrying cotton from the discharge end of said belt to a point in said main conveyor in advance of said condenser, and an adjustable damper located over the belt and at the intake end of said emergency conveyor for restricting the suction area above the belt through which the cotton must pass to enter the mouth of said emergency conveyor.

6. In a cotton distributing system, the combination of a series of cotton working machines, a belt for conveying cotton past the entire series of said machines, devices for automatically controlling the delivery of cotton by said belt to the different machines in accordance with their individual requirements, a main pneumatic conveyor for delivering cotton to said belt, a condenser at the discharge end of said pneumatic conveyor, and an emergency pneumatic conveyor for continuously carrying cotton from the discharge end of said belt to a point in said main conveyor in advance of said condenser.

7. In a cotton distributing system, the combination of a series of cotton working machines, mechanism for supplying cotton to said machines, said mechanism including pneumatic cotton conveying means and devices for controlling the distribution of the cotton automatically to the different machines in accordance with their individual requirements, and pneumatic means operative continuously to take directly from said mechanism any surplus cotton not required by said machines, and to return the cotton so taken automatically to said conveying means while the latter means continues to operate uninterruptedly.

8. In a cotton distributing system, the combination of a series of cotton working machines, means for supplying cotton to said machines; said means including a machine for preparing the cotton for delivery to said cotton working machines, conveying apparatus for carrying the cotton from said preparing machine to said cotton working machines, and devices for automatically controlling the delivery of cotton to the different cotton working machines in accordance with their individual requirements; and a pneumatic conveyor, additional to said conveying apparatus, for taking from the latter apparatus cotton conducted thereby past the entire series of cotton working machines, and automatically returning said cotton substantially as fast as it is received to said apparatus at a point in advance of the cotton working machines.

WILLIAM SHAW.